(12) United States Patent
Miyata et al.

(10) Patent No.: US 9,081,677 B2
(45) Date of Patent: Jul. 14, 2015

(54) METHOD AND DEVICE FOR ESTIMATING INPUT BIT ERROR RATIO

(75) Inventors: Yoshikuni Miyata, Tokyo (JP); Kenya Sugihara, Tokyo (JP); Kiyoshi Onohara, Tokyo (JP); Kazuo Kubo, Tokyo (JP); Hideo Yoshida, Tokyo (JP); Takashi Mizuochi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 155 days.

(21) Appl. No.: 13/982,403

(22) PCT Filed: Feb. 20, 2012

(86) PCT No.: PCT/JP2012/054011
§ 371 (c)(1),
(2), (4) Date: Jul. 29, 2013

(87) PCT Pub. No.: WO2012/115056
PCT Pub. Date: Aug. 30, 2012

(65) Prior Publication Data
US 2013/0311840 A1    Nov. 21, 2013

(30) Foreign Application Priority Data
Feb. 22, 2011  (JP) .................. 2011-036401

(51) Int. Cl.
*G06F 11/07* (2006.01)
*H04L 1/20* (2006.01)

(52) U.S. Cl.
CPC .............. *G06F 11/076* (2013.01); *H04L 1/203* (2013.01)

(58) Field of Classification Search
CPC ........... H04L 1/20; H04L 1/24; H04L 1/0061; H04L 1/203; G06F 11/076; G01R 31/3171

USPC .......................................... 714/704, E11.004
See application file for complete search history.

(56) References Cited

U.S. PATENT DOCUMENTS

2004/0126109 A1 * 7/2004 Downie ......................... 398/27
2011/0314358 A1 * 12/2011 Langenbach et al. ......... 714/786

FOREIGN PATENT DOCUMENTS

| JP | 1 143433    | 6/1989  |
| JP | 2003 333018 | 11/2003 |
| JP | 2006 128841 | 5/2006  |

OTHER PUBLICATIONS

Machine Translation of JP 2003-333018 A, published Nov. 2003, Inventor Takaya, 13 pages.*

(Continued)

*Primary Examiner* — Albert Decady
*Assistant Examiner* — Kyle Vallecillo
(74) *Attorney, Agent, or Firm* — Oblon, McClelland, Maier & Neustadt, L.L.P.

(57) ABSTRACT

An input bit error ratio estimating method executed by a communication control unit includes a computing, a condition determining, a first input BER estimating, a second input BER estimating, a third input BER estimating, and an input BER estimation result outputting. In the condition determining, the communication control unit determines which of a plurality of conditions set in advance to be narrowed down to one has been established, based on a post-internal decoding residual error detection ratio. Based on the condition that is determined in the condition determining as one that has been established, the communication control unit selects one out of a plurality of processing procedures for estimating the input BER, namely, selects one of the first input BER estimating to the third input BER estimating and executes the selected processing.

4 Claims, 6 Drawing Sheets

(56) References Cited

OTHER PUBLICATIONS

ITU-T Recommendation G.707, Series G: Transmission Systems and Media, Digital transmission systems—Terminal equipments—General, Network node interface for the synchronous digital hierarchy(SDH), International Telecomunication Union, pp. 114-128, (Mar. 1996).

International Search Report Issued Apr. 24, 2012 in PCT/JP12/054011 Filed Feb. 20, 2012.

* cited by examiner

METHOD AND DEVICE FOR ESTIMATING INPUT BIT ERROR RATIO

TECHNICAL FIELD

The present invention relates to a method and device for estimating an input bit error ratio in, for example, a digital transmission system.

BACKGROUND ART

In a conventional transmission method, for example, the Synchronous Digital Hierarchy (SDH) transmission method, which is popular in optical communication and which conforms to ITU-T Recommendation G.707 (see Non Patent Literature 1), the input bit error ratio (BER) is estimated with use of a control signal that is included in overhead (OH) and called Bit Interleaved Parity (BIP). As the BIP, even parity is calculated on a bit-by-bit basis for every byte in an SDH frame. Details of the BIP are described in Non Patent Literature 2.

CITATION LIST

Non Patent Literature

[NPL 1] ITU-T Recommendation G.707 (03/96)
[NPL 2] Kasai, Maki, Tsuji, and Ueda, "Wakariyasui SDH/SONET Denso Hoshiki" ("Easy Guide to SDH/SONET Transmission Methods"), Ohmsha, Ltd., pp. 56-69, 101-104, April 2001

SUMMARY OF INVENTION

Technical Problem

Configured as described above, conventional methods and devices for estimating the input bit error ratio have a problem in that the input BER cannot be estimated accurately when the input BER is, for example, 1E-3 or larger.

The present invention has been made to solve the problem described above, and an object of the present invention is to provide a method and device for estimating an input bit error ratio capable of accomplishing highly accurate input BER estimation even when the input BER is as large as, for example, 1E-2.

Solution to Problem

According to the present invention, there is provided an input bit error ratio estimating method, including: a computing step of computing a decoding bit inversion ratio and a post-decoding residual error detection ratio based on a signal for monitoring a decoding result of decoding processing of an error correction code; a condition determining step of determining which of a plurality of conditions set in advance to be narrowed down to one has been established based on the post-decoding residual error detection ratio; an input BER estimating step of selecting one of a plurality of processing procedures for estimating an input BER, based on one of the plurality of conditions that is determined in the condition determining step as one that has been established, and executing the selected one of the plurality of processing procedures; and an estimation result outputting step of outputting a result of the one of the plurality of processing procedures executed in the input BER estimating step.

According to the present invention, there is provided an input bit error ratio estimating device, including: computing means for computing a decoding bit inversion ratio and a post-decoding residual error detection ratio based on a signal for monitoring a decoding result of decoding processing of an error correction code; condition determining means for determining which of a plurality of conditions set in advance to be narrowed down to one has been established based on the post-decoding residual error detection ratio; input BER estimating means for selecting one of a plurality of processing procedures for estimating an input BER, based on one of the plurality of conditions that is determined by the condition determining means as one that has been established, and executing the selected one of the plurality of processing procedures; and estimation result outputting means for outputting a result of the one of the plurality of processing procedures executed by the input BER estimating means.

Advantageous Effects of Invention

According to the method and device for estimating an input bit error ratio of the present invention, which of the plurality of conditions set in advance to be narrowed down to one has been established is determined based on the post-decoding residual error detection ratio, one of the plurality of processing procedures for estimating the input BER is selected based on the established condition, and the selected processing is executed. Highly accurate input BER estimation is thus accomplished even when the input BER is as large as, for example, 1E-2.

DESCRIPTION OF EMBODIMENT

A mode for carrying out the present invention is described below with reference to the drawings.

First Embodiment

Figure 1:
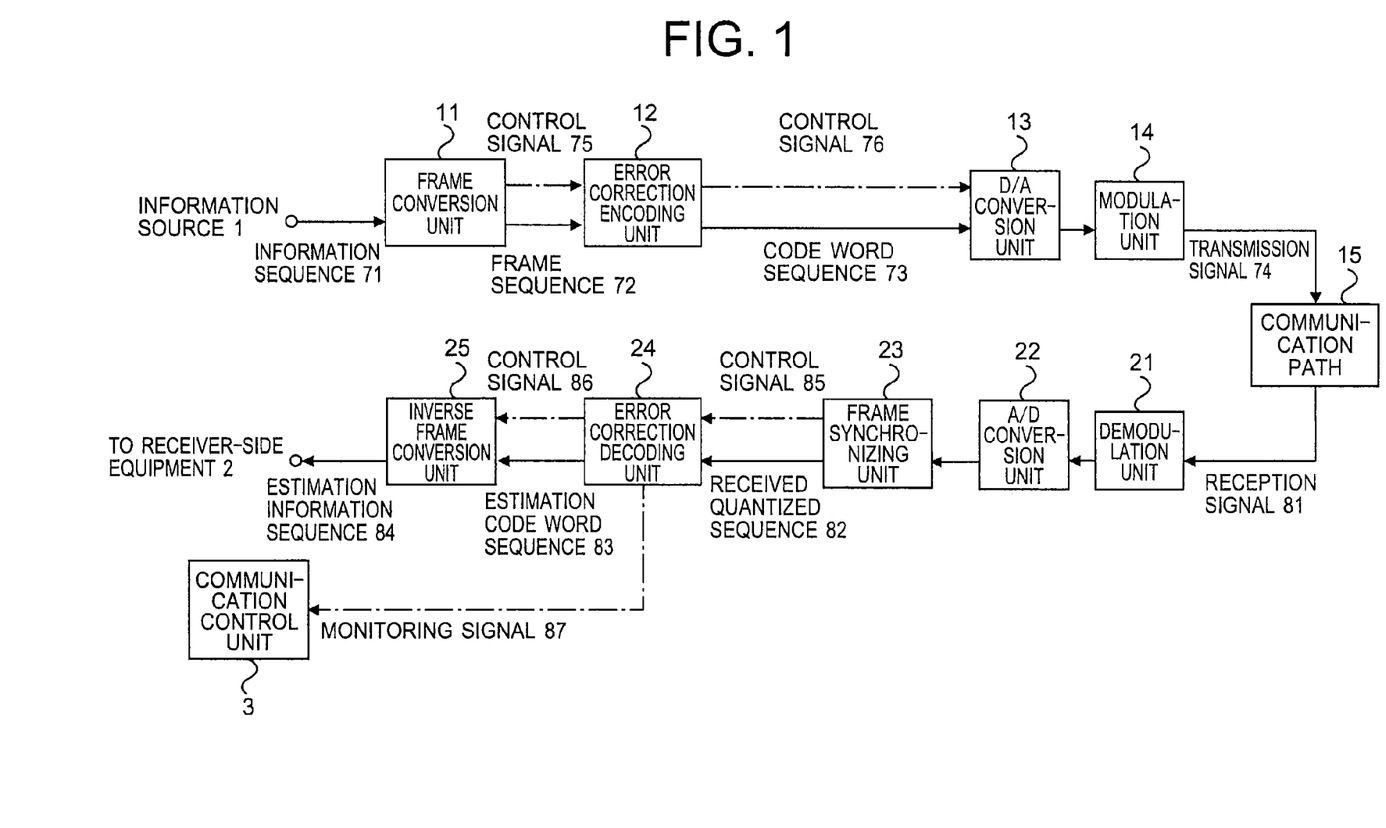
FIG. 1 A block diagram illustrating the configuration of a digital transmission system that includes an input bit error ratio estimating device according to a first embodiment of the present invention.

FIG. 1 is a block diagram illustrating the configuration of a digital transmission system (hereinafter simply referred to as "transmission system") according to a first embodiment of the present invention.

The transmission system in FIG. 1 includes a communication control unit 3, which functions as an input bit error ratio estimating device, a frame converting unit 11, which receives an information sequence 71 from an information source 1, an error correction encoding unit 12, which is connected to the frame conversion unit 11, a digital/analog (D/A) conversion unit 13, which is connected to the error correction encoding unit 12, a modulation unit 14, which is connected to the DA conversion unit 13, a communication path 15, which is connected to the modulation unit 14, a demodulation unit 21, which is connected to the modulation unit 14 via the communication path 15, an analog/digital (A/D) conversion unit 22, which is connected to the demodulation unit 21, a frame synchronizing unit 23, which is connected to the A/D conversion unit 22, an error correction decoding unit 24, which is connected to the frame synchronizing unit 23, and an inverse frame conversion unit 25, which is connected to the error correction decoding unit 24. The inverse frame conversion unit 25 is connected to receiver-side equipment 2.

The D/A conversion unit 13, the modulation unit 14, the communication path 15, the modulation unit 21, and the A/D conversion unit 22 each have a device configuration that is commonly used in digital transmission systems. A code word sequence output of the error correction encoding unit 12 is a digital signal, and the output digital signal is input to the modulation unit 14, where the input signal is modulated and is output as a transmission signal that is an analog signal. The D/A conversion unit 13, which is necessary for multi-value modulation that is higher than binary modulation, is not always necessary in the case of binary modulation.

Figure 2:
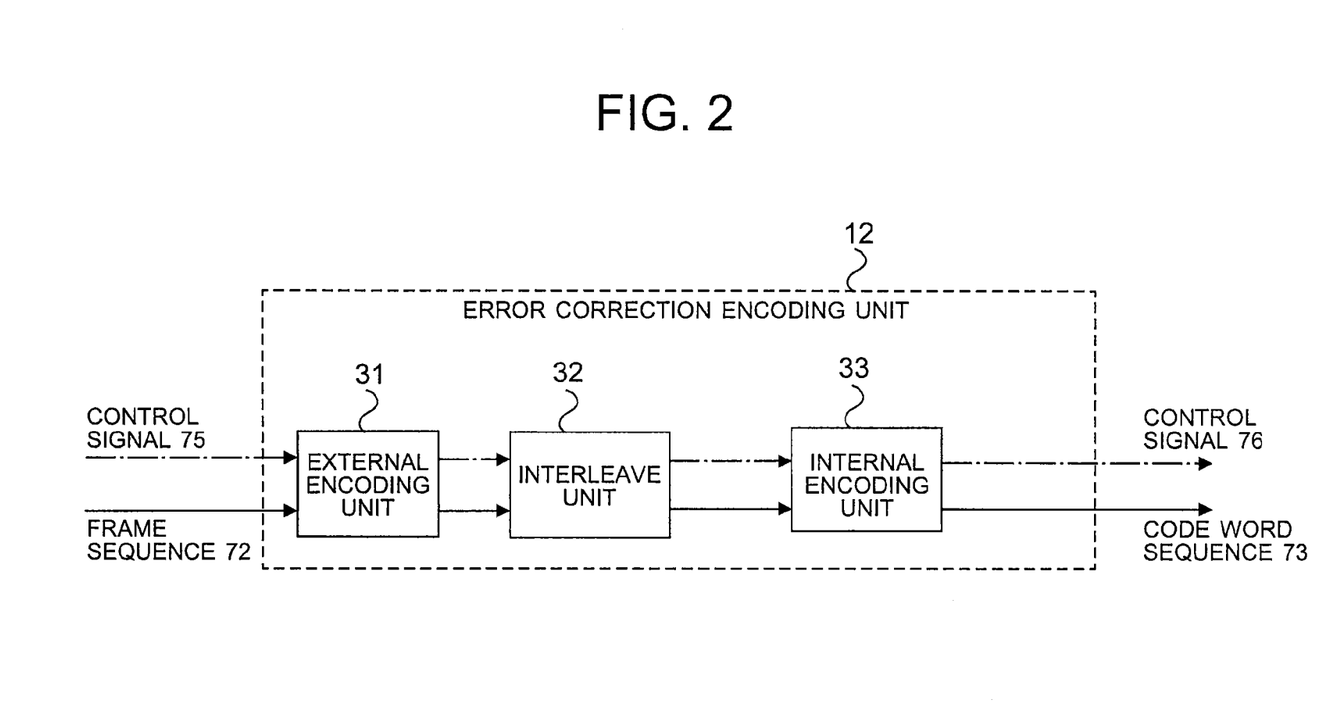
FIG. 2 A block diagram illustrating a concrete configuration example of an error correction encoding unit of FIG. 1.
Figure 3:
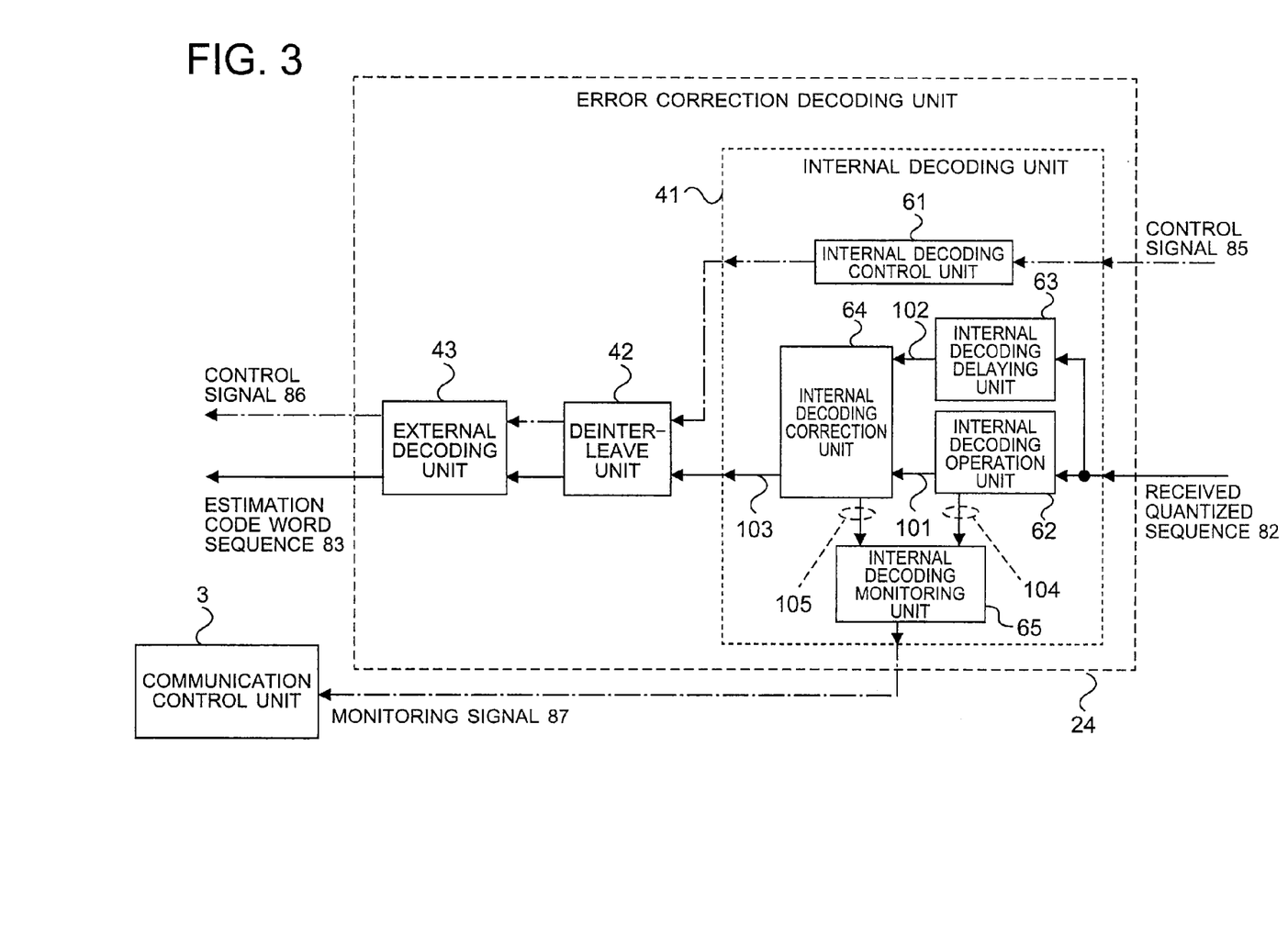
FIG. 3 A block diagram illustrating a concrete configuration example of an error correction decoding unit of FIG. 1.

FIG. 2 is a block diagram illustrating a concrete configuration example of the error correction encoding unit 12 of FIG. 1. FIG. 3 is a block diagram illustrating a concrete configuration example of the error correction decoding unit 24 of FIG. 1. In FIGS. 2 and 3, the error correction encoding unit 12 includes an external encoding unit 31, an interleave unit 32, and an internal encoding unit 33. The error correction decoding unit 24 includes an internal decoding unit 41, a deinterleave unit 42, and an external decoding unit 43. The internal decoding unit 41 includes an internal decoding control unit 61, an internal decoding operation unit 62, an internal decoding delaying unit 63, an internal decoding correction unit 64, and an internal decoding monitoring unit 65.

Figure 4:
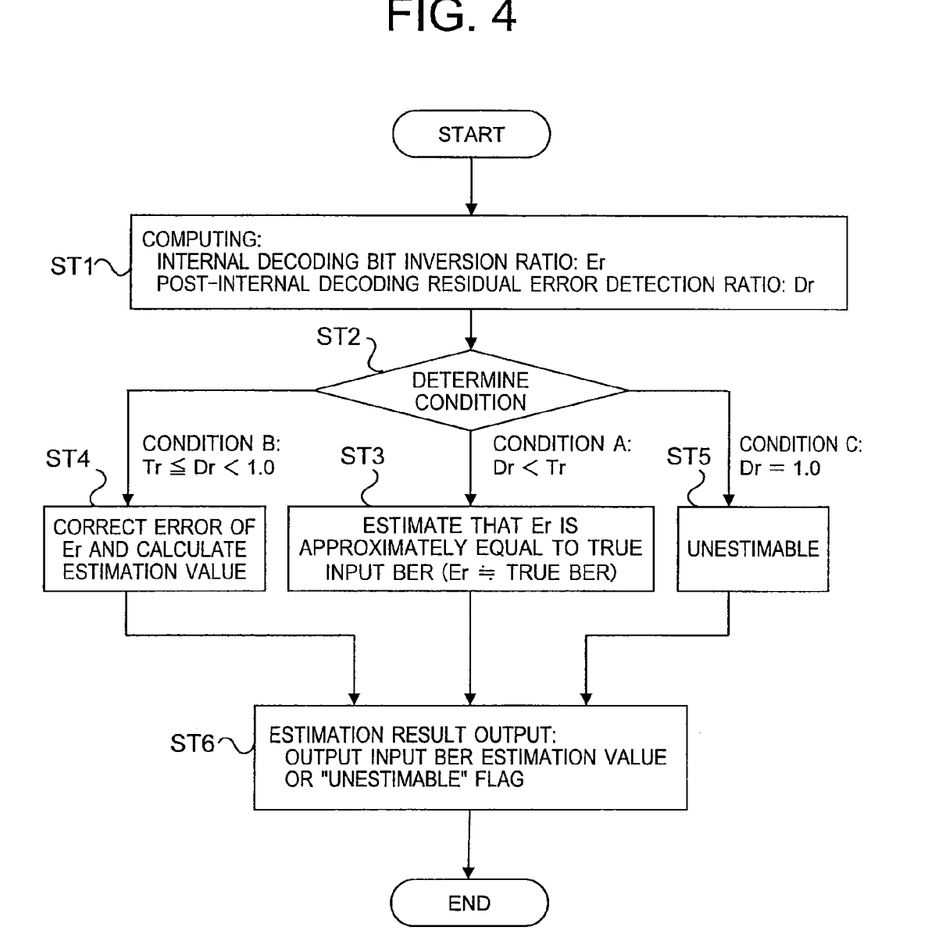
FIG. 4 A flow chart illustrating the operation of a communication control unit of FIG. 1.

FIG. 4 is a flow chart illustrating the operation of the communication control unit 3 of FIG. 1. In FIG. 4, an input bit error ratio estimating method executed by the communication control unit 3 includes a computing step ST1, a condition determining step ST2, a first input BER estimating step ST3, a second input BER estimating step ST4, a third input BER estimating step ST5, and an input BER estimation result outputting step ST6.

In other words, the communication control unit 3 includes computing means for executing the computing step ST1, condition determining means for executing the condition determining step ST2, input BER estimating means for executing the first to third input BER estimating steps ST3 to ST5, and estimation result outputting means for executing the input BER estimation result outputting step ST6 (none of the means is shown). The communication control unit 3 also includes a memory unit having programs for implementing the respective means stored thereon and a processor which executes the programs (the memory unit and the processor are not shown). The steps ST1 to ST6 of FIG. 4 are executed through computing processing of the processor.

Though omitted from FIGS. 2 and 3, various error correction codes, frame formats, and interleave/deinterleave configurations can be included as long as a feature of the first embodiment is maintained, specifically, deciding on a condition based on the post-internal decoding residual error detection ratio and switching to input BER estimating processing that is suitable for the condition.

The operation of the error correction encoding unit 12 and the error correction decoding unit 24 is described next. In FIGS. 2 and 3, a pre-encoding frame sequence 72, which is obtained by converting the information sequence 71 from the information source 1 into a given frame format in the frame conversion unit 11, and a control signal 75, which is used to identify the head, format, and the like of the given frame, are first input to the external encoding unit 31 in a given order in series or in parallel, or under a given interface standard such as SERDES Framer Interface (SFI).

For example, in the case of an Optical Channel Transport Unit-k (OTUk) frame which is normally used in optical communication and which conforms to ITU-T Recommendation G.709, the information sequence and the control signal are arranged in OTU Row 1 to OTU Row 4, and each Row is allocated areas for a control-use overhead (OH) signal (the length thereof in each Row is 1·16 bytes), a payload which corresponds to the information sequence (the length thereof in each Row is 238·16 bytes), and a parity sequence (the length thereof in each Row is 16·16 bytes). In the case of an OTUkV frame described in an appendix to ITU-T Recommendation G.709, the OH length and the payload length are the same as those in the OTUk frame, and an arbitrary length longer than the parity sequence length in the OTUk frame is allocated to a parity sequence of an internal code.

The frame conversion unit 11 which is a necessary circuit in the case where the frame format such as the OTUk frame or the OTUkV frame is taken into account is not always necessary in a digital transmission system which is capable of encoding frames continuously without being conscious of the frame format. The frame conversion unit 11 can also handle conversion into various other frame formats than the OTUk (OTUkV) frame format for optical communication, such as those for fixed cable communication, mobile wireless communication, satellite communication, and digital recording devices.

Returning to FIG. 2, the external encoding unit 31 next executes external encoding processing (processing of encoding with an external code). Specifically, the external encoding unit 31 performs input sequence adjustment, an external encoding operation, and output sequence adjustment on the pre-encoding frame sequence 72 input from the frame conversion unit 11, and outputs the result thereof as an external encoding output sequence.

An external encoding method that is appropriate here is one using a block code, which is suitable for hard-decision decoding and with which the relative circuit scale can be reduced, in particular, the Bose-Chaudhuri-Hocquenghem (BCH) code and the Reed-Solomon (RS) code. A concatenated code, a product code, or other codes that are higher in error correction ability than a block code alone may also be used. A particularly preferred configuration example for optical communication is one using a concatenated code or a product code that conforms to the OTUk frame described in an appendix to ITU-T Recommendation G.975.1 (a combination of a plurality of types of block codes such as the BCH code and the RS code). A configuration that combines a block code and a convolutional code can also be employed.

Next, the interleave unit 32 executes processing of sorting the sequence based on the given frame format, and outputs the resultant internal encoding input sequence to the internal encoding unit 33.

The internal encoding unit 33 executes internal encoding processing (processing of encoding with an internal code). The internal encoding unit 33 performs input sequence adjustment, an internal encoding operation, and output sequence adjustment on the internal encoding input sequence which has been sorted and input from the interleave unit 32, and outputs the result thereof as the code word sequence 73 to the D/A conversion unit 13.

Internal encoding methods that can be employed here are one using a block code such as the BCH code or the RS code, one using a convolutional code, one using a convolutional turbo code, one using a block turbo code, one using a low-density parity-check (LDPC) code, and the like. However, an appropriate internal code is a code that has a high error correction ability and that is capable of soft-decision decoding. In the first embodiment in particular, a case of using an LDPC code is described.

In the input sequence adjustment and output sequence adjustment of the external encoding unit 31 and the internal encoding unit 33, timing adjustment, sequence order adjustment, scrambling/descrambling processing, and the like are performed on the input/output sequence. While the interleave unit 32 alone conducts sequence order adjustment in the description of FIG. 2, other units may execute sequence order adjustment as long as the executed processing is compatible with the given frame format. For instance, sequence order adjustment may be conducted in the external encoding unit 31 so that interleave processing and deinterleave processing are respectively performed on an input to and an output from the external encoding unit 31, or sequence order adjustment may be conducted in the internal encoding unit 33 so that interleave processing and deinterleave processing are respectively performed on an input to and an output from the internal encoding unit 33, or the former sequence order adjustment and the latter sequence order adjustment may be executed both.

Information (data) transmitted between the function blocks (circuits) 31 to 33 inside the error correction encoding unit 12, between the circuits within the respective function blocks, between the error correction encoding unit 12 and the frame conversion unit 11 connected thereto, and between the error correction encoding unit 12 and the D/A conversion unit 13 connected thereto may be exchanged by a pipeline method in which information travels via a bus connecting paths of the function blocks to one another. Alternatively, information may be exchanged via a work memory area that can be referred to by adjacent upstream/downstream circuits. The external encoding unit 31 and the internal encoding unit 33 may also be connected to each other along a specific section under a given interface standard such as SFI. In this case, the external encoding unit 31 and the internal encoding unit 33 can be incorporated in different devices.

The operation of the error correction decoding unit 24 is described next. The error correction decoding unit 24 has a configuration corresponding to that of the error correction encoding unit 12, and has a function of decoding an error correction code that has been encoded by the error correction encoding unit 12. In FIG. 3, a received quantized sequence 82, which has been processed by the A/D conversion unit 22, and a control signal 85, which is adjusted by the frame synchronizing unit 23 and which is used to identify the head, format, and the like of a given frame, are first input to the internal decoding unit 41 in a given order in series or in parallel, or under a given interface standard such as SFI.

The frame synchronizing unit 23 is a circuit necessary to identify the head position of a frame by detecting overhead, which is attached on the transmission side and is included in the received quantized sequence 82 in the case where the frame format such as the OTUk frame or OTUkV frame described above is taken into account. In a digital transmission system which is capable of encoding frames continuously without being conscious of the frame format, the frame synchronizing unit 23 is not always necessary. The frame synchronizing unit 23 can also handle synchronization detection processing of various other frame formats than the OTUk (OTUkV) frame format for optical communication, such as those for fixed cable communication, mobile wireless communication, satellite communication, and digital recording devices.

In the case where the received quantized sequence 82 processed by the A/D conversion unit 22 is quantized into q bits per transmission symbol, a case where q=1 is called "hard decision" and a case where q>1 is called "soft decision". Soft decision is discussed in the first embodiment. However, the first embodiment can be configured with the use of hard decision as well. In the description of subsequent sequence processing, q bits per transmission symbol are deemed as one symbol, and one symbol of information is processed in a batch.

Returning to FIG. 3, the internal decoding unit 41 executes internal decoding processing (decoding with an internal code). Specifically, the internal decoding unit 41 performs input sequence adjustment, an internal decoding operation, and output sequence adjustment on the received quantized sequence 82 which has been processed by the A/D conversion unit 22, and output the result thereof as an internal decoding output sequence 103.

The internal decoding processing executed here is suited to the internal encoding method that has been used. In the case where a method using a block code such as the BCH code or the RS code has been chosen, hard-decision decoding is preferred, and soft-decision decoding is preferred in the case where a method using a convolutional code has been chosen. Iterative soft-decision decoding is preferred in the case where a method using a convolutional turbo code, a block turbo code, an LDPC code, or the like has been chosen. In the first embodiment in particular, a case of using iterative soft-decision decoding for an LDPC code is described. More concrete processing of the internal decoding is described later.

Returning to FIG. 3, the deinterleave unit 42 executes processing of sorting the sequence that is based on the given frame format and that corresponds to the sorting in the interleave unit 32 of the error correction encoding unit 12, and outputs an external decoding input sequence that is the result thereof to the external decoding unit 43.

The external decoding unit 43 then executes external decoding processing (processing of decoding with an external code). The external decoding unit 43 performs input sequence adjustment, an external decoding operation, and output sequence adjustment on the external decoding input sequence input from the deinterleave unit 42, and outputs the result thereof as an estimation code word sequence 83.

The external decoding processing executed here is suited to the external encoding method that has been used. In the case where a method using a block code suitable for hard-decision decoding, in particular, the BCH code, the RS code, or the like, has been chosen, hard-decision bounded distance decoding that is suited to the external encoding used is preferred as the external decoding processing executed in the external decoding unit 43. In the case where an external encoding method using a concatenated code, a product code, or the like has been employed, it is preferred to execute iterative hard-decision decoding in the external decoding unit 43.

Alternatively, soft-decision information (Q' bits per transmission symbol, Q'>1) may be output as the result of internal decoding so that iterative soft-decision decoding is executed with the use of an external code. An erasure flag (a flag that has a value 1 in the case where one transmission symbol of data has been erased and otherwise has a value 0) may be additionally output as the result of internal decoding so that decoding based on erasure correction is executed with the use of an external code. However, hard-decision decoding based on hard-decision information ($Q'=1$) is preferred as the external decoding processing.

The inverse frame conversion unit 25 (which corresponds to the frame conversion unit 11 on the transmission side) receives from the error correction decoding unit 24 the estimation code word sequence 83, which has a given frame format, and a control signal 86, which is used to identify the head, format, and the like of the given frame, in a given order in series or in parallel, or under a given interface standard such as SFI. The inverse frame conversion unit 25 then executes inverse frame conversion for removing, from the estimation code word sequence 83, bits that correspond to the overhead signal (OH signal) and bits that correspond to the parity sequence, and outputs an estimation information sequence 84 to the receiver-side equipment 2.

The inverse frame conversion unit 25 which is a necessary function block in the case where the frame format such as the OTUk frame or OTUkV frame described above is taken into account is not always necessary and may be omitted in a digital transmission system which is capable of encoding frames continuously without being conscious of the frame format. The inverse frame conversion unit 25 can also handle inverse conversion into various other frame formats than the OTUk (OTUkV) frame format for optical communication, such as those for fixed cable communication, mobile wireless communication, satellite communication, and digital recording devices.

In the input sequence adjustment and output sequence adjustment of the internal decoding unit 41 and the external decoding unit 43, timing adjustment, sequence order adjustment, scrambling/descrambling processing, and the like are performed on the input/output sequence. While the deinterleave unit 42 alone conducts sequence order adjustment in the description of FIG. 3, other units may execute sequence order adjustment as long as the executed processing is compatible with the encoding in the error correction encoding unit 12 and with the given frame format. For instance, sequence order adjustment may be conducted in the internal decoding unit 41 so that interleave processing and deinterleave processing are respectively performed on an input to and an output from the internal decoding unit 41, or sequence order adjustment may be conducted in the external decoding unit 43 so that interleave processing and deinterleave processing are respectively performed on an input to and an output from the external decoding unit 43, or the former sequence order adjustment and the latter sequence order adjustment may be executed both.

Information (data) transmitted between the function blocks 41 to 43 inside the error correction decoding unit 34, between the further inner function blocks 61 to 65, between the error correction decoding unit 24 and the frame synchronizing unit 23 connected thereto, and between the error correction decoding unit 23 and the inverse frame conversion unit 25 connected thereto may be exchanged by a pipeline method in which information travels via a bus connecting the function blocks to one another. Alternatively, information may be exchanged via a work memory area that can be referred to by adjacent upstream/downstream blocks (circuits). The internal decoding unit 41 and the external decoding unit 43 may also be connected to each other along a specific section under a given interface standard such as SFI. In this case, the internal decoding unit 41 and the external decoding unit 43 can be incorporated in different devices.

A more concrete description is given next on the operation of the internal decoding unit 41. The internal decoding processing is described here with reference to FIG. 3. The internal decoding unit 41 performs input timing adjustment, sequence order adjustment, descrambling processing, and the like on the received quantized sequence 82 which has been processed by the A/D conversion unit 22, based on the control signal 85 which has been adjusted by the frame synchronizing unit 23. In the case where an output from the frame synchronizing unit 23 is converted into a given interface standard such as SFI before being output, the internal decoding unit 41 executes inverse conversion from the interface standard as well. These processing procedures are controlled by the internal decoding control unit 61 which receives the control signal 85.

Under control of the internal decoding control unit 61, the internal decoding operation unit 62 performs a soft-input value operation on the received quantized sequence 82. For example, in the case where a code suitable for soft-decision decoding such as a convolutional code, a convolutional turbo code, a block turbo code, or an LDPC code has been chosen, the internal decoding operation unit 62 converts the received quantized sequence 82 which has q bits per transmission symbol into a soft input value which has Q bits per transmission symbol. This conversion is unnecessary in the case where it is hard-decision decoding that is executed. Similarly, the conversion is unnecessary in the case where the received quantized sequence which has q bits per transmission symbol can be deemed as a soft input value as it is in processing executed by the internal decoding operation unit 62.

Although the concrete processing method varies depending on what code and communication path model are employed, or other similar factors, any method can be used in the first embodiment. The first embodiment describes in particular an example of converting the received quantized sequence 82 which has q bits per transmission symbol into a soft input value which has Q bits per transmission symbol.

Returning to FIG. 3, the internal decoding operation unit 62 next performs an internal decoding operation on the soft input value and outputs an internal decoding operation result sequence 101 which is the result thereof to the internal decoding correction unit 64. The internal decoding processing executed here is suited to the internal encoding method that has been used. Hard-decision bounded distance decoding is preferred in the case where a method using a block code such as the BCH code or the RS code has been chosen, and soft-decision decoding is preferred in the case where a method using a convolutional code has been chosen. Iterative soft-decision decoding is preferred in the case where a method using a convolutional turbo code, a block turbo code, an LDPC code, or the like has been chosen. In the first embodiment in particular, a case of using iterative soft-decision decoding is used for an LDPC code is described.

The internal decoding operation result sequence 101, which is an output from the internal decoding operation unit 62, is expressed as, for example, a sequence of a flag that indicates whether a received hard-decision sequence is to be inversed or not in the case where hard-decision decoding is based solely on the hard-decision information ($Q'=1$) in binary external decoding processing. The flag means "inversed" when the flag value is 1, and "as it is" when the flag value is 0. In the following description of this specification, this flag is referred to as inversion flag, and a bit whose inversion flag is "1" is particularly called an inversion bit.

In the case where the result of multi-symbol decoding, or the soft-decision information ($Q'>1$), is output as the internal decoding operation result sequence 101, the internal decoding operation result sequence 101 can be expressed also by a multi-symbol numerical value having a given bit width, or by a quantization posterior probability sequence of the result of the iterative soft-decision operation. In the first embodiment in particular, a sequence that uses the inversion flag is described.

Returning to FIG. 3, under control of the internal decoding control unit 61, the internal decoding delaying unit 63 receives the received quantized sequence 82 and performs delaying processing that is suited to a processing delay of the internal decoding operation unit 62. The internal decoding delaying unit 63 outputs to the internal decoding correction unit 63 an internal decoding delay processing sequence 102, which is the result of the delaying processing.

For example, in the case where hard-decision decoding is based solely on the binary hard-decision information (Q'=1) in external decoding processing, binary information that corresponds to a received hard-decision sequence out of the received quantized sequence 82 can be kept in a buffer or the like to be output to the internal decoding correction unit 64 in time with the completion of the computing processing in the internal decoding operation unit 62. In the case where the result of multi-symbol decoding, or the soft-decision information (Q'>1), is output as the internal decoding operation result sequence 101, too, the received quantized sequence 82 that has a given bit width can be kept in the buffer or the like to be output to the internal decoding correction unit 64 in time with the completion of the computing processing in the internal decoding operation unit 62. In the first embodiment in particular, a case of performing delaying processing on a received hard-decision sequence is described.

Returning to FIG. 3, under control of the internal decoding control unit 61, the internal decoding correction unit 64 calculates the internal decoding output sequence 103 based on the internal decoding operation result sequence 101 output from the internal decoding operation unit 62 and the internal decoding delay processing sequence 102 output from the internal decoding delaying unit 63, and outputs the internal decoding output sequence 103.

For example, in the case where hard-decision decoding is based solely on the binary hard-decision information (Q'=1) in external decoding processing, the internal decoding correction unit 64 performs processing of inverting a relevant bit in the internal decoding delay processing sequence 102 (equivalent to a binary exclusive logical OR operation) only for one of inversion flags constituting the internal decoding operation result sequence 101 that corresponds to an inversion bit (a flag having a value 1). In the case where the internal decoding operation result sequence 101 is a multi-symbol or in the case where external decoding processing uses the soft-decision information (Q'>1), correction processing suitable for the former case or correction processing suitable for the latter case can be executed.

Described next is an input bit error ratio estimating method that includes condition determination based on the post-internal decoding residual error detection ratio and input BER estimation processing suited to the result of the condition determination which are a feature of the first embodiment. First, a monitoring signal 87 which is necessary for the input BER estimating processing is described with reference to FIG. 3. The internal decoding monitoring unit 65 receives a first internal monitoring signal 104, which is an output from the internal decoding operation unit 62, and a second internal monitoring signal 105, which is an output from the internal decoding correction unit 64, generates the monitoring signal 87, and outputs the generated signal to the communication control unit 3.

The first internal monitoring signal 104 which is an output from the internal decoding operation unit 62 is described next. This signal indicates whether or not a residual error has been detected in the result of the internal decoding operation processing of the internal decoding operation unit 62, namely, the internal decoding operation result sequence 101. For example, in hard-decision bounded distance decoding for a block code such as the BCH code or the RS code, whether or not it is possible to correct a sequence that is the processing target can be determined from the state of a syndrome, and the result of error detection thereof (namely, an "uncorrectable" flag) is accordingly output.

In the case of iterative soft-decision decoding for an LDPC code, it can be determined that the processing target sequence includes a residual error when a parity check (this, too, corresponds to a syndrome) performed on the result of the decoding does not return an all-zero value. A residual error flag that is the result of this parity check is therefore output. In the first embodiment in particular, a parity check is conducted on the result of iterative soft-decision decoding for an LDPC code, and a residual error flag which is the result of the determination is output as the first internal monitoring signal 104.

In the case where the internal decoding operation unit 62 uses a plurality of computing circuits to perform parallel processing on the received quantized sequence 82 that correspond to a plurality of code words, the result of adding each residual error flag described above may be output.

The second internal monitoring signal 105 which is an output from the internal decoding correction unit 64 is described next. This signal indicates the total count of inverted bits found in the result of internal decoding correction processing in the internal decoding correction unit 64, namely, the internal decoding delay processing sequence 102. In the case where hard-decision decoding is based solely on the binary hard-decision information (Q'=1) in external decoding processing, the internal decoding correction unit 64 outputs the total count of inversion flags constituting the internal decoding operation result sequence 101 that have a value 1.

In the case where the internal decoding operation result sequence 101 is a multi-symbol or in the case where external decoding processing uses the soft-decision information (Q'>1), the internal decoding correction unit 64 also outputs the total count of inverted hard-decision bits ultimately found in the internal decoding output sequence 103 which is in the form of an error numerical value or a quantization posterior probability, depending on whether the former case or the latter case applies. In the first embodiment in particular, the internal decoding correction unit 64 outputs the total count of inversion flags constituting the internal decoding operation result sequence 101 that have a value 1.

Returning to FIG. 3, the internal decoding monitoring unit 65 receives the first internal monitoring signal 104 and second internal monitoring signal 105 described above, and executes processing of generating the monitoring signal 87. Specifically, the internal decoding monitoring module 65 separately integrates residual error flags that are included in the first internal monitoring signal 104 and the count of inverted bits that are included in the second internal monitoring signal 105.

This monitoring signal integrating processing may be controlled so as to start/end at, for example, given timing of an internal operating clock of the internal decoding monitoring unit 65, or so as to start/end in response to a signal from the communication control unit 3.

The internal decoding monitoring unit 65 then outputs the results of the integration, along with a monitoring signal control signal, to the communication control unit 3 as the monitoring signal 87.

An input BER estimating operation of the communication control unit 3 is described next. FIG. 4 is a flow chart illustrating the input bit error ratio estimating operation of the communication control unit 3 of FIG. 1. Before the operation is described with reference to this flow chart, signs are defined as follows.

Post-internal decoding residual error count: D
Internal decoding inverted bit count: E
Frame count: F
Bits-per-frame count: N
post-internal decoding residual error detection ratio 123: $D_r$
Internal decoding bit inversion ratio 121: $E_r$
Condition determining threshold: $T_r$ The post-internal decoding residual error count D and the internal decoding inverted bit count E are included in the monitoring signal 87 which is input to the communication control unit 3. These are each values accumulated in a given time unit. The frame count F indicating the count of frames on which an internal decoding operation has been performed in the given time unit may be included in the monitoring signal 87, or may be calculated by estimation from the numerical value of the given time. However, the frame count here is not the unit of the processing in the frame conversion unit 11, and corresponds to the unit of the processing in the internal decoding unit 41 (in other words, the total count of internal code words).

The bits-per-frame count N is defined in advance based on the frame formats and the code configuration of internal codes. However, the frame unit here is not the unit of the processing in the frame conversion unit 11, and corresponds to the unit of the processing in the internal decoding unit 41 (in other words, the code length of internal code words).

Returning to FIG. 4, in the computing step ST1, the communication control unit 3 calculates the post-internal decoding residual error detection ratio $D_r$ and the internal decoding bit inversion ratio $E_r$ by the following operations based on the post-internal decoding residual error count D and the internal decoding inverted bit count E, which are obtained from the monitoring signal 87, and the frame count F and the bits-per-frame count N.

$$D_r = D/F \quad (1)$$

$$E_r = E/(F \cdot N) \quad (2)$$

In the condition determining step ST2, the communication control unit 3 next determines which of a plurality of conditions, here, A to C, set in advance to be narrowed down to one has been established, based on the post-internal decoding residual error detection ratio $D_r$. Specifically, the communication control unit 3 executes the following condition determination, and determines to which step the processing is to proceed depending on the established condition.

Condition A: $D_r < T_r \rightarrow$ to ST3

Condition B: $T_r \leq D_r < 1.0 \rightarrow$ to ST4

Condition C: $D_r = 1.0 \rightarrow$ to ST5

Based on the condition that is determined in the condition determining step ST2 as one that has been established, the communication control unit 3 selects one out of a plurality of processing procedures for estimating the input BER, namely, processing of the step ST3 to processing of the step ST5, and executes the selected processing (switches to and executes one of different types of input BER estimating processing). Specifically, when it is determined in the condition determining step ST2 that Condition A has been established, the communication control unit 3 estimates that $E_r$ is approximately equal to a true input BER 122 ("Er≈true input BER 122") in the first input BER estimating step ST3, and the processing proceeds to the input BER estimation result outputting step ST6. The basis of this estimation is described later.

In the case where it is determined in the condition determining step ST2 that Condition B has been established, on the other hand, the communication control unit 3 "corrects the error of $E_r$," and estimates the corrected value as the true input BER 122 in the second input BER estimating step ST4, and the processing proceeds to the input BER estimation result outputting step ST6. The basis of this estimation, too, is described later.

In the case where it is determined in the condition determining step ST2 that Condition C has been established, on the other hand, the communication control unit 3 determines that "the true input BER 122 cannot be estimated" in the third input BER estimating step ST5, and the processing proceeds to the input BER estimation result outputting step ST6. The basis of this estimation, too, is described later.

Lastly, in the input BER estimation result outputting step ST6, the communication control unit 3 outputs an estimated input BER value or an "unestimable" flag which is the result of one of the processing of the input BER estimating step ST3 to the processing of the input BER estimating step ST5.

Figure 5:
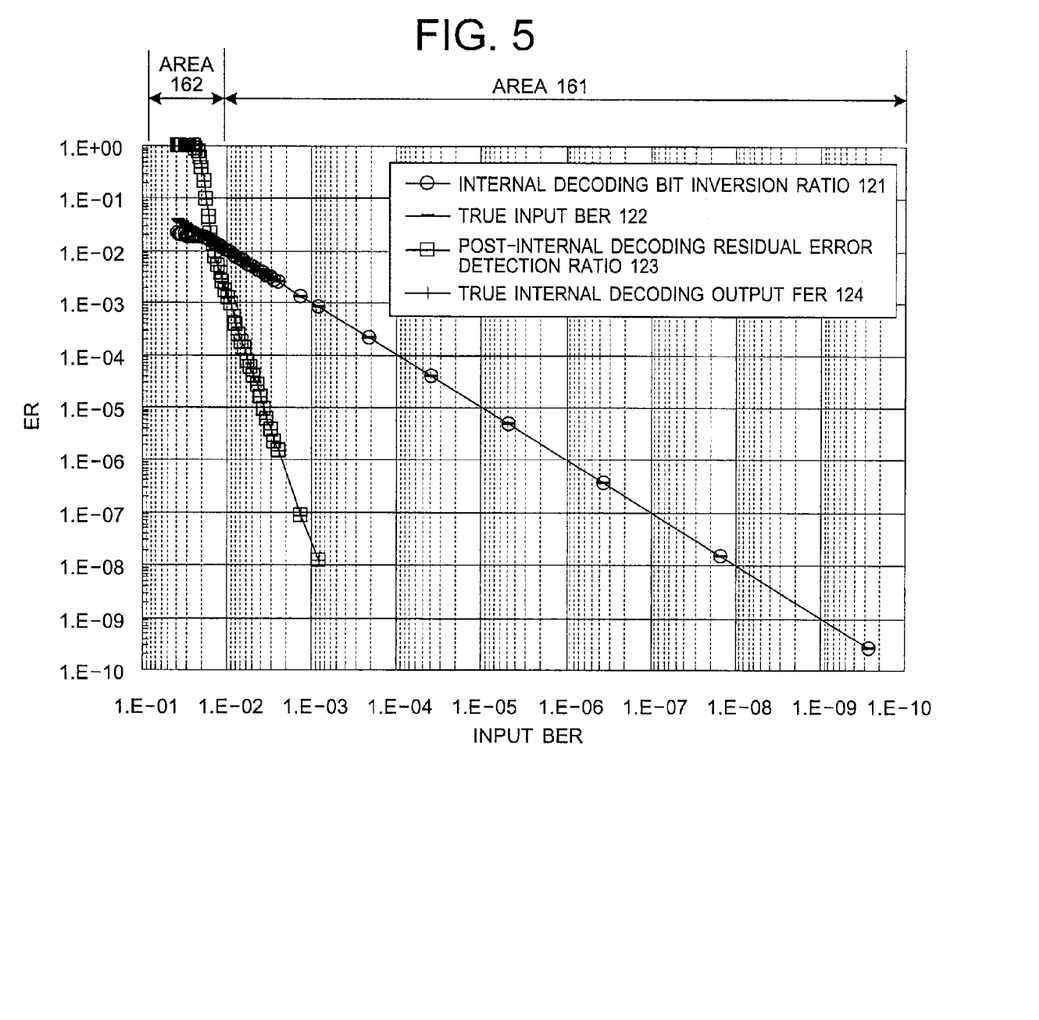
FIG. 5 A graph showing the result of a simulation that is conducted about an input BER estimating method of FIG. 4 with the use of an LDPC code.
Figure 6:
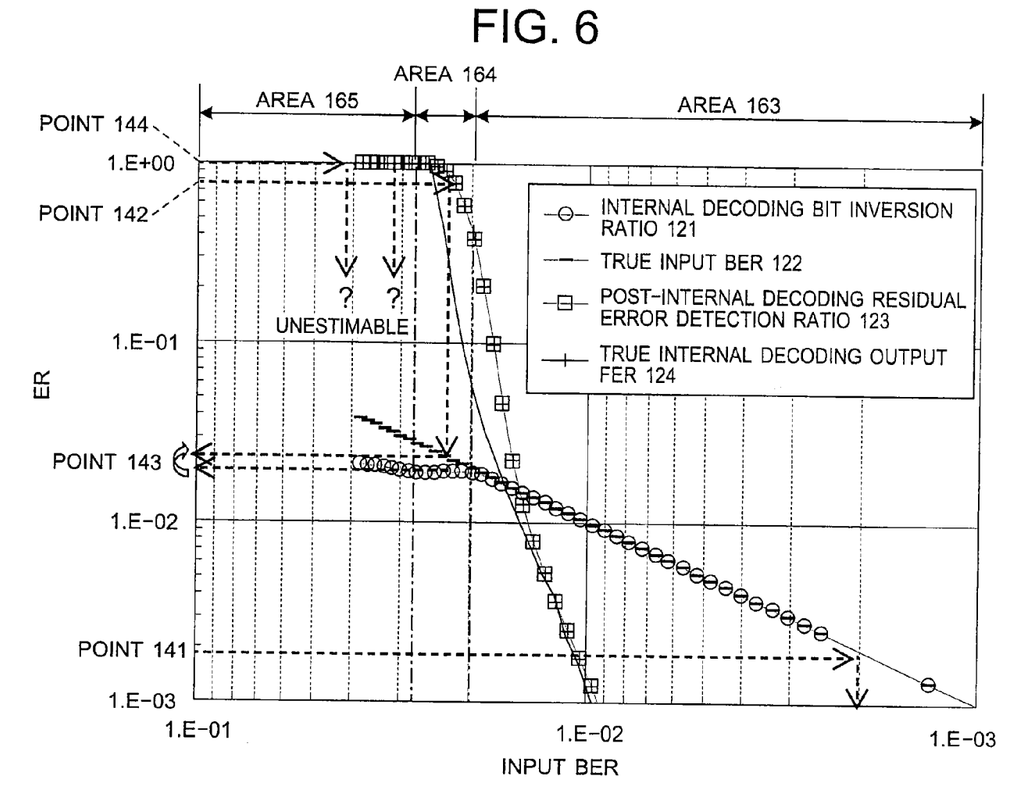
FIG. 6 A graph showing a part of FIG. 5 enlarged.

The result of examining the effectiveness of the input BER estimating method of FIG. 4 through a simulation (computer test) is described below with reference to FIGS. 5 and 6. FIG. 5 is a graph showing the result of a simulation that is conducted about the input BER estimating method of FIG. 4 by using an LDPC code as an internal code. FIG. 6 is a graph showing a part of FIG. 5 enlarged.

In FIG. 5, the axis of abscissa indicates the true input BER 122 and the axis of ordinate indicates numerical values plotted as follows. Marks ○ and ⅍ represent the internal decoding bit inversion ratio $E_r$ and the post-internal decoding residual error detection ratio $D_r$, respectively. Marks – and + represent the true input BER 122 and a true internal decoding output frame error ratio (FER) 124, respectively.

In an area 161 of FIG. 5, the internal decoding bit inversion ratio $E_r$ is substantially equal to the true input BER 122. The internal decoding bit inversion ratio $E_r$ differs from the true input BER 122 only in an area 162, where the input BER is as high as 1E-2. It is concluded from this that the proper way as the input BER estimating method is to regard the internal decoding bit inversion ratio $E_r$ as the true input BER 122 in the area 161 where the input BER is low and to correct an error only in the area 162 where the input BER is high.

The post-internal decoding residual error detection ratio $D_r$ is substantially equal to the true internal decoding output FER 124 in any area. This is probably because, with the nature of LDPC codes, in particular, there are hardly any undetected errors after error correction.

Performing the error correction described above by utilizing the feature described above, that the post-internal decoding residual error detection ratio $D_r$ is substantially equal to the true internal decoding output FER 124, is the main element of the method and device for estimating the input bit error ratio according to the first embodiment. Details of this error correction are described below with reference to FIG. 6.

The graph of FIG. 6 is divided into three areas by the level of the true input BER 122. Here, the graph is divided into a region 163, a region 164, and a region 165 which are stated in ascending order of the true input BER 122. This area division corresponds to the condition determination and branching into Conditions A, B, and C in the condition determining step ST2 of FIG. 4.

The area 163 and the area 164 are separated from each other by comparing the post-internal decoding residual error detection ratio $D_r$ with the condition determining threshold $T_r$. The value of the condition determining threshold $T_r$ varies depending on the encoding method used, the communication path condition, the quantization bit width q, and the like. The proper value of $T_r$ in the example of FIG. 6 is 0.5, for instance. The dividing point between the area 164 and the area 165 is determined by whether the post-internal decoding residual error detection ratio $D_r$ is equal to 1.

Returning to FIG. 6, it is obvious from the graph that the internal decoding bit inversion ratio $E_r$ is substantially equal to the true input BER 122 in the area 163 (Condition A). It can therefore be estimated that $E_r$ is approximately equal to the true input BER 122 ("Er≈true input BER 122") as indicated by a point 141. This input BER estimation corresponds to the estimating operation in the first input BER estimating step ST3 of FIG. 4.

The internal decoding bit inversion ratio $E_r$ differs from the true input BER 122 in the area 164 (Condition B). However, accurate input BER estimation is possible if data is tracked from the post-internal decoding residual error detection ratio $D_r$ at a point 142 and a slight error at a point 143 is corrected.

A concrete method of the error correction in the area 164 (Condition B) is, for example, one in which a fixed value is added to the internal decoding bit inversion ratio $E_r$. A more accurate method is, for example, one in which a table holding correction values to be added to the internal decoding bit inversion ratio $E_r$ is prepared in advance in the communication control unit 3, and a correction value from the table is added. The correction value table is for saving a different correction value for each numerical value of the post-internal decoding residual error detection ratio $D_r$. The correction value table to be prepared only needs to hold correction values for the area 164 (Condition B), and therefore is very small in size compared to the case where correction values for all areas are saved.

Returning to FIG. 6, in the area 165 (Condition C) where the input BER is higher than the correction ability of any LDPC code, a post-internal decoding residual error is detected in every decoding result. Consequently, the location of the true input BER 122 in the area 165 cannot be determined as indicated by a point 144. It is therefore determined in this case that "the true input BER 122 cannot be estimated".

As has been described, the method according to the first embodiment includes the computing step of computing the post-internal decoding residual error detection ratio and the internal decoding bit inversion ratio, the condition determining step of determining which of the plurality of conditions set in advance to be narrowed down to one has been established based on the post-internal decoding residual error detection ratio, the input BER estimating step of selecting one out of the plurality of processing procedures for estimating the input BER based on the established condition and executing the selected processing procedure, and the input BER estimation result outputting step of outputting the result of the estimation. Highly accurate input BER estimation is thus accomplished even when the input BER is as large as, for example, 1E-2.

The first embodiment has discussed an example in which the method and device for estimating the input bit error ratio employ concatenated coding that uses as an external code a block code, a concatenated code, or a product code for hard-decision decoding and that uses as an internal code an LDPC code for iterative soft-decision decoding, and the input BER is estimated based on the internal decoding bit inversion ratio and post-internal decoding residual error detection ratio of the LDPC code which is an internal code. The configuration of the present invention can take various other forms such as coding that uses an LDPC code alone, coding that uses a block code, a concatenated code, or a product code alone for hard-decision decoding, coding that uses one of these as an internal code, and coding that combines a convolutional code for soft-decision decoding with cyclic redundancy check (CRC). However, the configuration according to the first embodiment is most favorable in terms of performance and circuit configuration.

In the case of using an LDPC code as an internal code, in particular, the input BER can be estimated more accurately because most bit errors are corrected with the LDPC code, substantially all post-decoding residual errors of the LDPC code can be detected, and bit error correction (bit inversion) and residual error detection can be conducted simultaneously. In the case where the BCH code or the RS code is used in hard-decision bounded distance decoding, error correction (bit inversion) cannot be conducted simultaneously if an error is uncorrectable (if a residual error is detected). Input bit errors in this phenomenon therefore invite estimation accuracy deterioration in input BER estimation.

Implementing an internal code and an external code in different devices is difficult because this usually requires to combine with the decoding result of the external code. In contrast, the first embodiment of the present invention in which only the decoding result of the internal code is used is easily implemented.

The present invention is not limited to the configuration of the concrete example given in the first embodiment. It goes without saying that the present invention allows one to suitably combine an error correction encoding method, a frame format, an input/output format, a transmission rate, and the like, and to implement the combination, as long as the combination is feasible.

In addition, the present invention is not applied to optical transmission systems exclusively, and is applicable to various transmission systems for fixed cable communication, mobile wireless communication, and satellite communication, and to digital recording devices.

The invention claimed is:

1. An input bit error ratio estimating method, comprising:
a computing step of computing a decoding bit inversion ratio and a post-decoding residual error detection ratio based on a signal for monitoring a decoding result of decoding processing of an error correction code;
a condition determining step of determining which of a plurality of conditions set in advance to be narrowed down to one has been established based on the post-decoding residual error detection ratio;
an input BER estimating step of selecting one of a plurality of processing procedures for estimating an input BER, based on one of the plurality of conditions that is determined in the condition determining step as one that has been established, and executing the selected one of the plurality of processing procedures; and
an estimation result outputting step of outputting a result of the one of the plurality of processing procedures executed in the input BER estimating step,
wherein the plurality of conditions in the condition determining step comprise the following Conditions A to C:
Condition A: $D_r < T_r$;
Condition B: $T_r \leq D_r < 1.0$; and
Condition C: $D_r = 1.0$,
where $D_r$ represents a post-decoding residual error detection ratio, and $T_r$ represents a condition determining threshold, and wherein the input BER estimating step comprises:
   estimating the input BER as the decoding bit inversion ratio when Condition A is established;
   estimating the input BER by correcting an error of the decoding bit inversion ratio when Condition B is established; and
   processing the input BER as unestimable when Condition C is established.

2. An input bit error ratio estimating method according to claim 1, wherein the computing in the computing step is carried out based on a signal for monitoring a decoding result of an innermost error correction code in error correction encoding that uses at least two types of error correction codes in combination.

3. An input bit error ratio estimating method according to claim 1, wherein the computing in the computing step is carried out based on a signal for monitoring a result of decoding that uses an LDPC code as the error correction code.

4. An input bit error ratio estimating device, comprising:
   computing means for computing a decoding bit inversion ratio and a post-decoding residual error detection ratio based on a signal for monitoring a decoding result of decoding processing of an error correction code;
   condition determining means for determining which of a plurality of conditions set in advance to be narrowed down to one has been established based on the post-decoding residual error detection ratio;
   input BER estimating means for selecting one of a plurality of processing procedures for estimating an input BER, based on one of the plurality of conditions that is determined by the condition determining means as one that has been established, and executing the selected one of the plurality of processing procedures; and
   estimation result outputting means for outputting a result of the one of the plurality of processing procedures executed by the input BER estimating means,
wherein the plurality of conditions in the condition determining means comprise the following Conditions A to C:
   Condition A: $D_r < T_r$;
   Condition B: $T_r \leq D_r < 1.0$; and
   Condition C: $D_r = 1.0$,
   where $D_r$ represents a post-decoding residual error detection ratio, and $T_r$ represents a condition determining threshold, and
wherein the input BER estimating means performs:
   estimating the input BER as the decoding bit inversion ratio when Condition A is established;
   estimating the input BER by correcting an error of the decoding bit inversion ratio when Condition B is established; and
   processing the input BER as unestimable when Condition C is established.

* * * * *